J. H. & T. E. CONNELLY.
Chemical Annex for Fire-Engines.
No. 208,375. Patented Sept. 24, 1878.
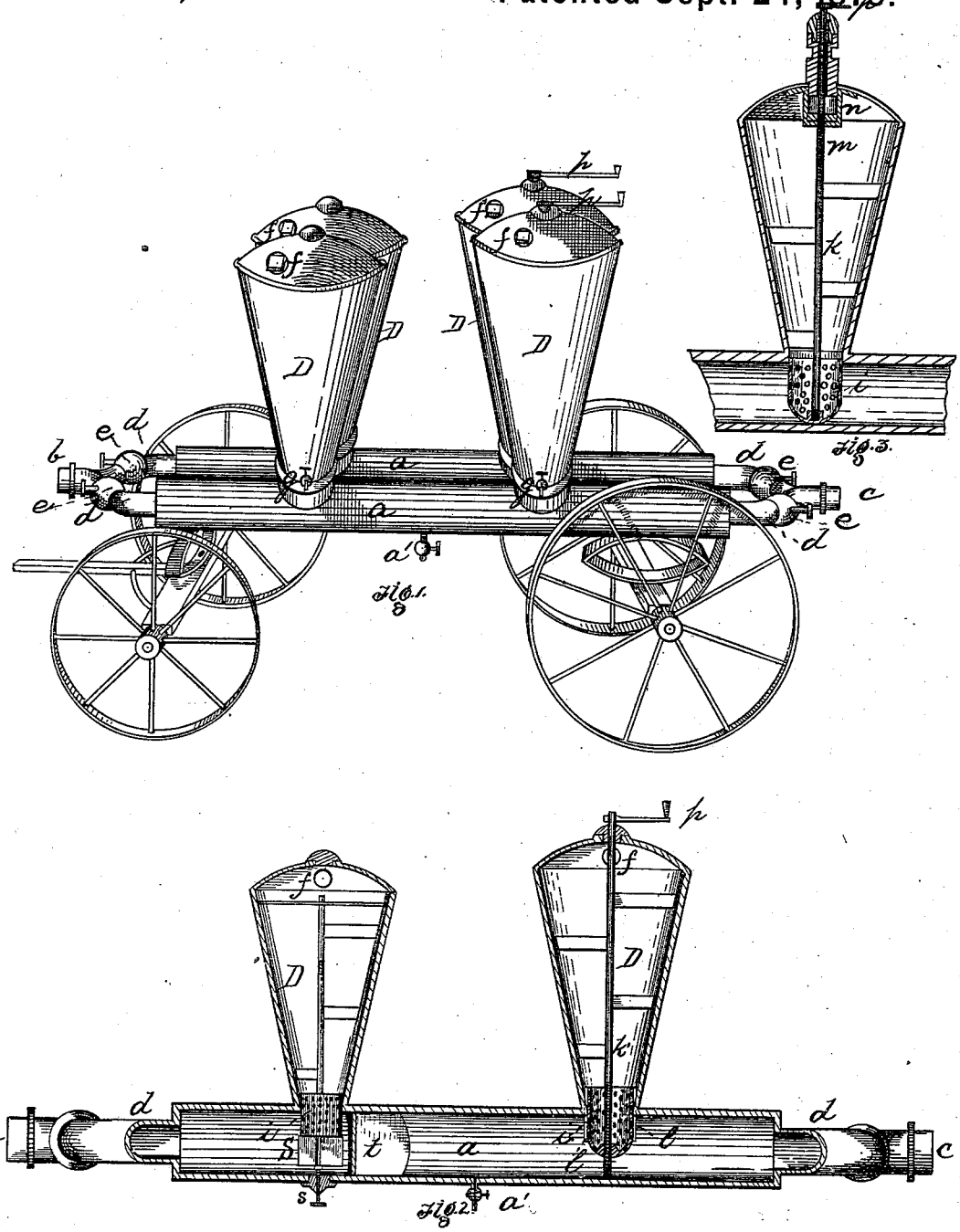

UNITED STATES PATENT OFFICE.

JOSEPH H. CONNELLY AND THOMAS E. CONNELLY, OF PITTSBURG, PENNSYLVANIA, ASSIGNORS TO THEMSELVES AND CHARLES LOCKHART, OF SAME PLACE.

IMPROVEMENT IN CHEMICAL ANNEXES FOR FIRE-ENGINES.

Specification forming part of Letters Patent No. 208,375, dated September 24, 1878; application filed August 29, 1878.

*To all whom it may concern:*

Be it known that we, JOSEPH H. CONNELLY and THOMAS E. CONNELLY, of the city of Pittsburg, in the county of Allegheny and State of Pennsylvania, have invented a new and useful Improvement in Chemical Annexes for Fire-Engines; and we do hereby declare the following to be a full, clear, and exact description thereof, reference being had to the accompanying drawings, forming part of this specification, in which—

Figure 1 is an elevation, in perspective, of devices embodying our invention. Fig. 2 is a vertical longitudinal section of one section of the same. Fig. 3 is a sectional detail view, showing a slight modification in the devices for operating the cage or valve.

Like letters refer to like parts wherever they occur.

Our invention relates to the construction and operation of what may be termed an "annex," or devices for mixing chemicals with a stream of water projected from a hydrant, steam fire-engine, or like source of power.

It consists, mainly, in combining, with a series of combining tubes or pipes, a series of receptacles for chemicals and a series of devices for delivering the chemicals from the receptacles to the combining-tubes, the latter being so constructed as to gage and regulate the supply of chemicals fed to the water; and also in details of construction hereinafter more specifically set forth.

We will now proceed to describe our invention, so that others skilled in the art to which it appertains may apply the same.

In the drawings is shown a suitable carriage, on which we mount two or more horizontal tubes or pipes, $a$, which we term the "combining-tubes." These tubes should be larger than the induction and eduction tubes, and of sufficient diameter to insure proper support to the chemical receptacles or domes. Each combining-tube $a$ is provided with a try-cock, $a'$, and the two combining-tubes are connected with each other and with the induction and eduction tubes $b\ c$ by pipes $d$, the whole provided with valves or stop-cocks $e$, so that by proper adjustment the stream of water from an engine or hydrant may be forced through either or both of the combining-tubes $a$. In the eduction-tube we prefer to use a check-valve, and, if desired, a check-valve may be inserted in the induction-pipe, so as to prevent any back-flow in case of low pressure or when the water is shut off.

Mounted on each of the combining-tubes $a$, and communicating therewith, are sets of domes or receptacles, D, for the reception of chemicals or fire-extinguishing compounds. These receptacles are preferably funnel-shaped, or taper from the top to their junction with the combining-tubes $a$, to facilitate the discharge of their contents, each being provided with a capped charging-orifice, $f$, and a try-cock, $g$, for determining when the receptacle is empty.

In the opening between the dome D and combining-tubes $a$ is arranged a reticulated valve or cage, $i$, which may be made of wire, perforated sheet metal, or like material, said cage or valve adapted to be raised or lowered by the shaft of the feed mechanism. The construction may be that shown in Fig. 2, wherein the lower end of the shaft $k$ is threaded, and works through a nut in the bottom of the cage or valve, the latter being prevented from turning by splines or feathers $l$; or, if preferred, the cage $i$ may be made fast to the shaft $k$, and the shaft threaded above, as at $m$, to work through a nut, $n$, as shown in Fig. 3, the latter being the most desirable in some respects, as the amount of projection of the shaft $k$ enables the operator to determine the distance the cage or valve $i$ projects into the combining-tube, and thus to regulate the quantity of chemical or extinguishing compound supplied to the stream of water. In order to prevent the material in the receptacle from becoming packed, and also to feed it to the cage $i$, the shaft $k$ is provided with a series of blades, with faces set at a suitable angle; and to impart motion to the shaft, a crank, $p$, or its equivalent may be used.

We sometimes find it desirable to operate the feed mechanism by the current of water passing through the combining-tube, thus rendering the devices automatic, in which case we attach a flutter-wheel or buckets to the cage or valve, as shown at S, Fig. 2, securing the cage to the shaft $k$, so that the two will move or revolve together, and adjusting the cage by a screw or piston, $s$, which passes through a stuffing-box on the under side of the combining-tube. In order to properly direct the current to the flutter-wheel or buckets S, a deflector, $t$, may be arranged in the combining-tube $a$.

The above constitute our devices, with which may be used any compounds applicable to the extinguishing of fires, whether said compounds or agents react upon each other in solution, or are only mechanically mixed or held in suspension, and thus cast with the stream upon the fire. That to which we give preference, however, is described in Letters Patent No. 196,562, October 30, 1877; and in charging the receptacles we usually place the granulated bicarbonate of soda and the anhydrous sulphate of alumina in separate receptacles.

The devices described are employed as follows: The receptacles or domes having been properly charged, and the induction-pipe connected with some source of water-supply and power—as, for instance, a hydrant or engine—the cocks $e$ are set to direct the stream through either or both of the combining-tubes $a$, as the exigency of the case demands. The shafts $k$ are then operated to lower the cages or valves $i$ into the combining-tube $a$ a distance proportionate to the amount of chemical or fire-extinguishing compound to be added to the water, and the current forced through the combining-tube absorbs the compound, which is gradually fed down from the receptacles. As a general rule but one combining-tube is in use at a time, and when the receptacles thereof have been exhausted, which can be readily ascertained by means of the try-cocks $g$, the cocks $e$ are set to switch the current of water to the other combining-tube. After using the annex, the try-cocks may be used for draining and clearing the device.

We are aware that a water-wheel operated by the force of the stream of water to be charged has heretofore been devised for feeding and mixing the chemicals, and do not claim such subject-matter; but, Having thus set forth our invention, what we claim, and desire to secure by Letters Patent, is—

1. In an apparatus of the class specified, the combination, with a combining-tube, of a dome or receptacle and an adjustable cage or valve, substantially as and for the purpose specified.

2. In an apparatus of the class specified, the combination of a combining-tube, a receptacle or dome, an adjustable cage or valve, and a device for agitating and feeding down the contents of the receptacle, substantially as specified.

3. In an apparatus of the class specified, the combination of a combining-tube, a receptacle or dome, a cage, and stirrers or feed mechanism, and a flutter-wheel or buckets for operating the feed mechanism, substantially as specified.

4. The combination of two or more combining-tubes, connected by valved pipes with two or more domes or receptacles, provided with adjustable cages or valves and arranged on the combining-tubes, substantially as and for the purpose specified.

In testimony whereof we, the said JOSEPH H. CONNELLY and THOMAS E. CONNELLY, have hereunto set our hands.

JOSEPH H. CONNELLY.
THOMAS E. CONNELLY.

Witnesses:
 R. H. WHITTLESEY,
 F. W. RITTER, Jr.